US010576777B2

(12) United States Patent
Nishimi et al.

(10) Patent No.: US 10,576,777 B2
(45) Date of Patent: Mar. 3, 2020

(54) HYDRAULIC TRANSFER PRINTING BASE FILM

(71) Applicant: KURARAY CO., LTD., Kurashiki-shi (JP)

(72) Inventors: Akio Nishimi, Saijo (JP); Masahiro Takafuji, Saijo (JP); Takashi Nerio, Kurashiki (JP); Satoru Fujita, Saijo (JP)

(73) Assignee: KURARAY CO., LTD., Kurashiki-shi (JP)

( * ) Notice: Subject to any disclaimer, the term of this patent is extended or adjusted under 35 U.S.C. 154(b) by 335 days.

(21) Appl. No.: 15/571,068

(22) PCT Filed: Jun. 14, 2016

(86) PCT No.: PCT/JP2016/067615
§ 371 (c)(1),
(2) Date: Nov. 1, 2017

(87) PCT Pub. No.: WO2016/204133
PCT Pub. Date: Dec. 22, 2016

(65) Prior Publication Data
US 2018/0111410 A1   Apr. 26, 2018

(30) Foreign Application Priority Data

Jun. 15, 2015 (JP) .................. 2015-119914

(51) Int. Cl.
| | |
|---|---|
| *B44C 1/17* | (2006.01) |
| *B44C 1/175* | (2006.01) |
| *C08K 3/34* | (2006.01) |
| *C08K 7/08* | (2006.01) |
| *C08L 29/04* | (2006.01) |
| *C08J 5/18* | (2006.01) |
| *C08K 7/10* | (2006.01) |
| *C08K 3/22* | (2006.01) |
| *C08K 5/053* | (2006.01) |

(52) U.S. Cl.
CPC ............ *B44C 1/1758* (2013.01); *B44C 1/175* (2013.01); *C08J 5/18* (2013.01); *C08K 3/346* (2013.01); *C08K 7/08* (2013.01); *C08K 7/10* (2013.01); *C08L 29/04* (2013.01); *C08J 2329/04* (2013.01); *C08K 5/053* (2013.01); *C08K 2003/2227* (2013.01); *C08K 2201/003* (2013.01); *C08K 2201/016* (2013.01)

(58) Field of Classification Search
CPC ...................................................... B44C 1/175
See application file for complete search history.

(56) References Cited

U.S. PATENT DOCUMENTS

2002/0037946 A1   3/2002   Isozaki et al.

FOREIGN PATENT DOCUMENTS

| | | | |
|---|---|---|---|
| CN | 103847412 A | * | 6/2014 |
| CN | 104185559 A | * | 12/2014 |
| JP | 54-033115 A | | 3/1979 |
| JP | 2002-053674 A | | 2/2002 |
| JP | 2002-146053 A | | 5/2002 |
| JP | 2002-275339 A | | 9/2002 |
| JP | 2003-104436 A | | 4/2003 |
| JP | 2010155453 A | * | 7/2010 |
| JP | 2011-046188 A | | 3/2011 |
| JP | 2012245779 A | * | 12/2012 |
| JP | 2013121725 A | * | 6/2013  ............ B32B 27/20 |
| WO | 2010/082522 A1 | | 7/2010 |

OTHER PUBLICATIONS

International Search Report dated Aug. 16, 2016. in PCT/JP2016/067615 filed Jun. 14, 2016.

* cited by examiner

*Primary Examiner* — Cachet I Proctor
(74) *Attorney, Agent, or Firm* — Oblon, McClelland, Maier & Neustadt, L.L.P.

(57) ABSTRACT

Provided are a single-layered hydraulic transfer printing base film, including 1.5 to 15 parts by mass of a plate or needle filler with an average particle diameter of from 2 to 14 μm and an aspect ratio of from 4 to 60 based on 100 parts by mass of polyvinyl alcohol and a method of producing a hydraulic transfer printing base film, including forming a film using a liquid containing 1.5 to 15 parts by mass of a plate or needle filler with an average particle diameter of from 2 to 14 μm and an aspect ratio of from 4 to 60 based on 100 parts by mass of polyvinyl alcohol. A hydraulic transfer printing base film that is not easily broken when fed from a roll and a method of producing the base film are thus provided.

8 Claims, No Drawings

HYDRAULIC TRANSFER PRINTING BASE FILM

TECHNICAL FIELD

The present invention relates to a hydraulic transfer printing base film to produce a hydraulic transfer printing film used for printing on an article subjected to transfer printing, such as a shaped object with a three dimensional bumpy surface or a curved surface. The present invention also relates to a method of producing the hydraulic transfer printing base film, a roll formed by rolling up the hydraulic transfer printing base film, a hydraulic transfer printing film produced by printing on a surface of the hydraulic transfer printing base film and a method of producing the same, and a method of hydraulic transfer printing using the hydraulic transfer printing film.

BACKGROUND ART

For formation of a print layer to give design to a surface of a shaped object with a three dimensional bumpy surface or a curved surface or to improve surface properties, a method including using a hydraulic transfer printing film is known where a transfer printing print layer is formed on a surface of a water-soluble or water-swellable film. For example, Patent Document 1 describes a method including floating a hydraulic transfer printing film on a surface of a liquid represented by water, directing a printed surface of the film upward, followed by pressing an arbitrary shaped object as an article subjected to transfer printing from above the film, thereby transfer printing the print layer on a surface of the article using the hydraulic pressure.

PRIOR ART DOCUMENT

Patent Document

Patent Document 1: JP 54-33115 A
Patent Document 2: JP 2002-146053 A

SUMMARY OF THE INVENTION

Problems to be Solved by the Invention

Hydraulic transfer printing base films used for production of a hydraulic transfer printing film is often continuously formed into a long film and then rolled up into a roll and packed in the form, of a roll to be transferred to a fabrication manufacturer or the like; the unpacked roll is then mounted to a feeder and the hydraulic transfer printing base film fed from the feeder is subjected to fabrication, such as printing, to form a hydraulic transfer printing film.

In such a case, there is a problem of breaking of the hydraulic transfer printing base film when the hydraulic transfer printing base film is fed from the feeder. This problem occurs particularly noticeably in high-speed printing. In a continuous processing line, it takes time to re-guide a hydraulic transfer printing base film to a processing device, and breaking of a hydraulic transfer printing base film thus causes severe loss of production.

To prevent breaking of a hydraulic transfer printing base film, improvement in mechanical strength of the hydraulic transfer printing base film is considered. An example of such a method includes blending a filler. Known PVA films containing a filler include a PVA film containing a specific amount of a filler and having surface roughness in a specific range and the like (refer to Patent Document 2). However, even by, simply blending a filler, there is still a room for reduction in breaking when a hydraulic transfer printing base film is fed from a roll.

The present invention has been made to solve the above problem, and it is an object thereof to provide a hydraulic transfer printing base film that is not easily broken when fed from a roll and a method of producing the base film, a roll formed by rolling up the hydraulic transfer printing base film, a hydraulic transfer printing film that is produced by printing on a surface of the hydraulic transfer printing base film and a method of producing the film, and a method of hydraulic transfer printing using the hydraulic transfer printing film.

Means for Solving the Problems

The present inventors have made extensive investigations to achieve the above object and found that a hydraulic transfer printing base film containing a plate or needle filler with a specific average particle diameter and a specific aspect ratio inhibits adhesion of the film surfaces and also increases mechanical strength of the film itself, and as a result, breaking in feeding from a roll is greatly reduced. The present inventors made further investigations based on the findings to complete the present invention.

That is, the present invention relates to:

[1] a single-layered hydraulic transfer printing base film, comprising 1.5 to 15 parts by mass of a plate or needle filler with an average particle diameter of from 2 to 14 µm and an aspect ratio of from 4 to 60 based on 100 parts by mass of polyvinyl alcohol (hereinafter, "polyvinyl alcohol" may be referred to as "PVA");

[2] the hydraulic transfer printing base film according to [1] above, wherein the PVA has a degree of saponification of from 80 to 99 mol %;

[3] the hydraulic transfer printing base film according to [1] or [2] above, wherein the PVA has an average degree of polymerization of from 500 to 3,000;

[4] a method of producing a hydraulic transfer printing base film, comprising forming a film using a liquid containing 1.5 to 15 parts by mass of a plate or needle filler with an average particle diameter of from 2 to 14 µm and an aspect ratio of from 4 to 60 based on 100 parts by mass of PVA;

[5] a roll formed by rolling up the hydraulic transfer printing base film according to any one of [1] to [3] above;

[6] a hydraulic transfer printing film produced by printing on a surface of the hydraulic transfer printing base film according to any one of [1] to [3] above;

[7] a method of producing a hydraulic transfer printing film, comprising: feeding the hydraulic transfer printing base film from the roll according to [5] above; and printing on a surface of the fed base film; and

[8] a method of hydraulic transfer printing, comprising: floating the hydraulic transfer printing film according to [6] above on a liquid surface, directing the printed surface upward; and pressing an article from above the floated hydraulic transfer printing film.

Effects of the Invention

The present invention provides a hydraulic transfer printing base film that is not easily broken when fed from a roll and a method of producing the base film, a roll formed by rolling up the hydraulic transfer printing base film, a hydraulic transfer printing film that is produced by printing on a surface of the hydraulic transfer printing base film and a method of producing the film, and a method of hydraulic transfer printing using the hydraulic transfer printing film.

MODES FOR CARRYING OUT THE INVENTION

The present invention is described below in detail.

The hydraulic transfer printing base film of the present invention contains PVA. As the PVA, a product of saponification of polyvinyl ester produced by polymerizing one or more types of vinyl esters, such as vinyl acetate, vinyl formate, vinyl propionate, vinyl butyrate, vinyl pivalate, vinyl versatate, vinyl laurate, vinyl stearate, vinyl benzoate, and isopropenyl acetate, may be used. Among the above vinyl esters, vinyl acetate is preferred for the ease of PVA production, availability, costs, and the like.

The polyvinyl ester is preferably produced using one or more types of vinyl ester only and more preferably produced using only one type of vinyl ester as a monomer. The polyvinyl ester, however, may be a copolymer of one or more types of vinyl esters and another monomer copolymerizable therewith unless the effects of the present invention are not inhibited.

Examples of such another monomer copolymerizable with the above vinyl ester include: α-olefins having a carbon number of from 2 to 30, such as ethylene, propylene, 1-butene, and isobutene; (meth)acrylic acid or, a salt thereof; (meth)acrylates, such as methyl (meth)acrylate, ethyl (meth) acrylate, n-propyl (meth)acrylate, i-propyl (meth)acrylate, n-butyl (meth)acrylate i-butyl (meth)acrylate, t-butyl (meth) acrylate, 2-ethylhexyl (meth)acrylate, dodecyl (meth)acrylate, and octadecyl (meth)acrylate; (meth)acrylamide derivatives, such as (meth)acrylamide, N-methyl (meth) acrylamide, N-ethyl (meth)acrylamide, N,N-dimethyl (meth)acrylamide, diacetone (meth)acrylamide, (meth)acrylamide propanesulfonate or a salt thereof, (meth)acrylamide propyl dimethylamine or a salt thereof, and N-methylol (meth)acrylamide or a derivative thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as (meth)acrylonitrile; vinyl halides, such as vinyl chloride, vinylidene chloride, vinyl fluoride, and vinylidene fluoride; allyl compounds, such as allyl acetate and allyl chloride; maleic acid or a salt, an ester, or an acid anhydride thereof; itaconic add or a salt, an ester, or an add anhydride thereof; vinylsilyl compounds, such as vinyltrimethoxysilane; unsaturated sulfonic add; and the like. The above polyvinyl esters may have a structural unit derived from one or more types of said another monomer described above.

A ratio of structural units derived from said another monomer in the above polyvinyl ester, based on the molar number of the all structural units constituting the polyvinyl ester, is preferably 25 mol % or less, more preferably 15 mol % or less, and even more preferably 5 mol % or less. If the ratio is more than 25 mol %, the affinity between the hydraulic transfer printing base film and the print layer and the like are likely to decrease.

The above PVA may be modified by one or more types of graft copolymerizable monomer unless the effects of the present invention are not inhibited. Examples of the graft copolymerizable monomer include: unsaturated carboxylic acid or a derivative thereof; unsaturated sulfonic acid or a derivative thereof; α-olefins having a carbon number of from 2 to 30; and the like. A ratio of structural units derived from the graft copolymerizable monomer in the PVA, based on the molar number of the all structural units constituting the PVA, is preferably 5 mol % or less.

In the above PVA, part of the hydroxyl groups may be cross-linked or not cross-linked. In the above PVA, part of the hydroxyl groups may form an acetal structure by reaction with an aldehyde compound, such as acetaldehyde and butylaldehyde, or the like or may form no acetal structure without reaction with such a compound.

The above PVA preferably has a degree of polymerization of from 500 to 3,000, more preferably from 700 to 2,800, and even more preferably from 1,000 to 2,500. The degree of polymerization not less than the lower limit improves the mechanical strength of a hydraulic transfer printing base film thus produced and the base film is not easily broken when fed from a roll. Meanwhile, the degree of polymerization not more than the upper limit improves the efficiency in production of hydraulic transfer printing base films and also improves the water solubility of the hydraulic transfer printing base film and also the hydraulic transfer printing film, leading to easier hydraulic transfer printing at a more economic process rate. The degree of polymerization herein means an average degree of polymerization measured in accordance with the description in JIS K6726-1994.

The above PVA has a degree of saponification of preferably from 80 to 99 mol %, more preferably from 83 to 96 mol %, and even more preferably from 85 to 90 mol %. The degree of saponification of the PVA within the range improves the water solu bility of the hydraulic transfer printing base film and also the hydraulic transfer printing film, leading to easier hydraulic transfer printing at a more economic process rate. The degree of saponification of the PVA herein means a ratio (mol %) of the molar number of the vinyl alcohol units to the total molar number of the structural units that may be converted to vinyl alcohol units by saponification (typically, vinyl ester units) and the vinyl alcohol units. The degree of saponification can be measured in accordance with the description in JIS K6726-1994.

The content of the PVA in the hydraulic transfer printing base film is, from the perspective of securing the basic, properties as a hydraulic transfer printing base film and the like, preferably 50 mass % or more, more preferably 80 mass % or more, and even, more preferably 85 mass % or more. The upper limit of the content is not particularly limited as long as satisfying the requirements in the present invention, while the content is preferably 98 mass % or less and more preferably 97 mass % or less.

The hydraulic transfer printing base film of the present invention contains a plate or needle filler with an average particle diameter of from 2 to 14 μm and an aspect ratio of from 4 to 60. In this context, the needle shape covers a wide concept from a relatively sharp longitudinal end (this is generally called as a spindle shape) to a hemisphere or almost-flat longitudinal end. The material for the filler is not particularly limited and may be an inorganic filler or an organic filler. Examples of the filler material include clay, talc, alumina, and the like. The filler is preferably an inorganic filler and more preferably talc.

The filler has to have an average particle diameter of from 2 to 14 μm. If the average particle diameter is less than 2 μm, sufficient slip properties are not obtained, causing easy adhesion of the film surfaces and easy breaking of the hydraulic transfer printing base film when fed from a roll. In contrast, if the average particle diameter is more than 14 μm, when the hydraulic transfer printing base film is fed from a roll, a hole is prone to be made in the hydraulic transfer printing base film at the filler as a starting point, and the base film easily becomes broken. From such a perspective, the average particle diameter is preferably 3 μm or more, more preferably 4 μm or more, and even more preferably 5 μm or more. The diameter is preferably 13 μm or less and more preferably 12 μm or less. The average particle diameter of the filler is obtained by laser diffraction scattering. Specifically, a 2 mass % water dispersion of the filler to be measured is prepared to measure the dispersion using a laser diffraction/scattering particle size distribution analyzer "Partica LA-950" manufactured by HORIBA Ltd. to obtain the diameter.

The filler has to have an aspect ratio of from 4 to 60. If, the aspect ratio is less than 4 or more than 60, sufficient slip properties are not obtained, causing easy adhesion of the film surfaces and easy breaking of the hydraulic transfer printing base film when fed from a roll. From such a perspective, the lower limit of the aspect ratio is preferably 10 or more. From the same perspective, the upper limit of the aspect ratio is preferably 50 or less, more preferably 48 or less, and even more preferably 45 or less. The aspect ratio of the filler is obtained by dividing the longitudinal axis of the filler by the transverse axis. In the case of a plate filler, the longitudinal axis may be the average particle diameter and the transverse axis may be the average thickness of the filler. In the case of a needle filler, the longitudinal axis may be an average length of the filler and the transverse axis may be the average width of the filler. In this context, any of the average thickness, the average length, and the average width described above is obtained from a photograph by a scanning electron microscope (SEM). They are obtained by averaging the thicknesses, the lengths, and the widths, respectively, of any 100 fillers in the photograph. For the width of the filler, a width in an intermediate portion of the length of an individual filler may be measured.

The content of the above filler in the hydraulic transfer printing base film of the present invention ranges between 1.5 and 15 parts by mass based on 100 parts by mass of the PVA. If the content is less than 1.5 parts by mass, sufficient slip properties are not obtained, causing easy adhesion of the film surfaces and easy breaking of the hydraulic transfer printing base film when fed from a roll. In contrast, if the content is more than 15 parts by mass, the hydraulic transfer printing base film becomes brittle, causing easy breaking when being fed. From such a perspective, the content based on 100 parts by mass of the PVA is preferably 2 parts by mass or more. The content is also preferably 12 parts by mass or less and more preferably 10 parts by mass or less.

The hydraulic transfer printing base film of the present invention has to be single layered. If the hydraulic transfer printing base film is a multilayer film formed by coating a coating layer containing the filler and the PVA on a PVA film not containing the filler, the film thus produced does not have sufficient rigidity while slip properties may be given to the film. In this case, due to the transfer tension in the direction of flow in the production and printing procedures of the hydraulic transfer printing base film, the multilayer hydraulic transfer printing base film is easily wrinkled.

The hydraulic transfer printing base film may contain a plasticizer to give flexibility. The plasticizer is preferably polyhydric alcohol, and specific examples thereof include ethylene glycol, glycerin, propylene glycol, diethylene glycol, diglycerin, triethylene glycol, tetraethylene glycol, trimethylol propane, and the like. The plasticizer content in the hydraulic transfer printing base film based on 100 parts by mass of the PVA is preferably 20 parts by mass or, less and more preferably 15 parts by mass or less. If the plasticizer content is more than 20 parts by mass, blocking sometimes occurs in the hydraulic transfer printing base film.

The hydraulic transfer printing base film may contain a water-soluble polymer other than the PVA, for the purpose of giving mechanical strength required to form a print layer on the hydraulic transfer printing base film, maintaining moisture resistance during hand ling of a hydraulic transfer printing base film, or adjusting the rate of flexibilization due to liquid absorption while the hydraulic transfer printing film with a print layer formed thereon is floated on the liquid surface, the extendability on the liquid surface, the time taken to be diffused in the liquid, the ease of deformation in the hydraulic transfer printing procedure, and the like.

Examples of the water-soluble polymer other than the PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinyl pyrrolidone, cellulose, acetyl cellulose, acetyl butyl cellulose, carboxymethyl cellulose, methyl cellulose, ethyl cellulose, hydroxyethyl cellulose, sodium alginate, and the like. The content of the water-soluble polymer other than the PVA in the hydraulic transfer printing base film is preferably 15 parts by mass or less and more preferably 10 parts by mass or less based on 100 parts by mass of the PVA. If the content of the water-soluble polymer other than the PVA is more than 15 parts by mass, the solubility and the dispersibility of the hydraulic transfer printing film during hydraulic transfer printing may decrease.

In addition, the hydraulic transfer printing base film may contain a boron-based compound for the purpose of adjusting the rate of flexibilization due to liquid absorption while the hydraulic transfer printing film with a print layer formed thereon is floated on the liquid surface, the extendability on the liquid surface, the time taken to be diffused in the liquid, and the like.

The boron-based compound is preferably boric acid or borax. The content of the boron-based compound in the hydraulic transfer printing base film, is preferably 5 parts by mass or less and more preferably 1 part by mass or less based on 100 parts by mass of the PVA. The boron-based compound content more than 5 parts by mass may cause a decrease in the water solubility of the hydraulic transfer printing base film and the hydraulic transfer printing film and difficulty in hydraulic transfer printing at an economic process, rate.

The hydraulic transfer printing base film may contain a surfactant. The type of surfactant is not particularly limited, and known anionic, cationic, or nonionic surfactant may be used. When the hydraulic transfer printing base film contains such a surfactant, the surfactant content in the hydraulic transfer printing base film is preferably 4 parts by mass or less based on 100 parts by mass of the PVA. The surfactant content more than 4 parts by mass may cause bleed out and a decrease in handling properties.

The hydraulic transfer printing base film may contain other components, such as a heat stabilizer, an ultraviolet absorber, an antioxidant, and a colorant other than the components mentioned above. The content of such other components in general is, although it depends on the type, preferably 10 parts by mass or less and more preferably 5 parts by mass or less based on 100 parts by mass of the PVA. The other component content more than 10 parts by mass sometimes deteriorates the impact resistance of the hydraulic transfer printing base film.

The hydraulic transfer printing base film of the present invention may have an appropriately selected thickness by considering the balance between the water solubility and the process passing capability. The thickness generally ranges between 10 and 100 μm, preferably between 20 and 80 μm, and more preferably between 30 and 50 μm. When the thickness is the lower limit or more, the process passing capability of the hydraulic transfer printing base film can be improved. Meanwhile, when the thickness is the upper limit or less, the water solubility of the hydraulic transfer printing base film as well as the hydraulic transfer printing film can be improved, leading to easier hydraulic transfer printing at, a more economic process rate.

A general hydraulic transfer printing base film may be a long film or a rectangular film. In the case of a long film, a rolled product is continuously fed and printed on the surface to make a hydraulic transfer printing film. The obtained hydraulic transfer printing film can be continuously served for hydraulic transfer printing directly, or it can be once rolled up and then fed for hydraulic transfer printing. The hydraulic transfer printing base film of the present invention may also have either shape of a long film or a rectangular film of relatively short in length (e.g., the length of each side of less than 1 m) or may be even polygonal, such as triangular and pentagonal, or circular. From the perspective of the handling properties during hydraulic transfer printing and the like, a long film or a rectangular film is preferred, and considering the capabilities of continuous printing, hydraulic transfer printing, and the like, a long, film is more preferred.

Such a long film is not particularly limited in length and width. From the perspective of productivity in printing, the length is preferably 1 m or more, more preferably 100 m or more, and even more preferably 1000 m or more. Examples of the upper limit in length include 10,000 m. Meanwhile, from the perspective of productivity in printing, the width is preferably 50 cm or more, more preferably 80 cm or more, and even more preferably 100 cm or more. For the ease of production of, a hydraulic transfer printing base film with a uniform thickness, the width is preferably 4 m or less and more preferably 3 m or less.

The method of forming the hydraulic transfer printing base film of the present invention is not particularly limited, and for the ease of production of a film excellent in process passing capability, the film is preferably formed using a liquid for film formation containing 1.5 to 15 parts by mass of the filler based on 100 parts by mass of the PVA. The filler content is more preferably 2 parts by mass or more. The filler content is more preferably 12 parts by mass or less and even more preferably 10 parts by mass or less. Specific examples of such a liquid for film formation include a liquid containing PVA, the filler, and a liquid medium and having PVA dissolved or melted therein and the like.

Examples of the liquid medium used for preparation of the liquid for film formation include water, dimethyl sulfoxide, dimethyl formamide, dimethyl acetamide, N-methyl pyrrolidone, ethylene glycol, glycerin, propylene glycol, diethylene glycol, triethylene glycol, tetraethylene glycol, trimethylol propane, ethylene diamine, diethylene triamine, and the like. One or more types of them may be used for the medium. Among them, water is suitably used for the environmental load and the recovery properties.

The volatile component rate (ratio of volatile component content, such as the liquid medium removed by volatilization or evaporation during film formation) of the liquid for film formation is, although depending on the method of forming the film, the film formation conditions, and the like, generally from 50 to 95 mass %, preferably from 55 to 90 mass %, and particularly preferably from 60 to 85 mass %. The liquid for film formation with an excessively low volatile component rate causes too high viscosity of the liquid, for film formation and difficulty in filtration and defoaming during preparation of the liquid for film formation, resulting in difficulty in production of a hydraulic transfer printing base film with less foreign objects and defects. In contrast, the liquid for film formation with an excessively high volatile component rate may cause too low density of the liquid for film formation, resulting in difficulty in industrial production of hydraulic transfer printing base films.

As a method of forming a hydraulic transfer printing base film using the above liquid for film formation, for example, a wet film formation method, a gel film formation method, a casting film formation method, an extrusion film formation method, or the like may be employed. A method by combination of them or the like may be employed as well. Among the above film formation method, the casting film formation method or the extrusion film formation method is preferably employed for production of a hydraulic transfer printing base film with uniform thickness and, width and good properties.

As a specific film formation method, an industrially preferred method includes: discharging or casting the liquid for film formation uniformly on a peripheral surface of a rotating and heated roll (or a belt) located on the most-upstream side using a T slit die, a hopper plate, an I-die, a lip coater die, or the like; evaporating and drying the volatile components from one surface of the film discharged or casted on the roll (or the belt); subsequently further drying the film on the peripheral surface of one or more rotating and heated rolls located on a downstream side, or further drying the film by passing the film through a hot air drier; and then rolling up the film by a roller device. The drying by a heated roll and the drying by a hot air drier may be appropriately combined.

The hydraulic transfer printing base film after film formation may be unoriented. Alternatively, the base film may be uniaxially or biaxially oriented for the purpose of improvement in mechanical properties in accordance with the transfer printing conditions for hydraulic transfer printing, and the like.

By printing on a surface of the hydraulic transfer printing base film of the present invention, the base film is made into a hydraulic transfer printing film. The printing method is not particularly limited and a print layer may be formed by employing a known printing method. For example, gravure printing, screen printing, offset printing, roll coating, or the like may be employed. The printing may be directly performed with printing ink on the hydraulic transfer printing base film or may be performed by once forming a print layer on another film and then transfer printing the layer to the hydraulic transfer printing base film. In the former case of directly printing with printing ink on the hydraulic transfer printing base film, a problem may occur in limitation of the printing ink composition, the drying procedure, color shift in multicolor printing, and the like. The latter case of printing is thus preferred in which a print layer is once formed on another film to be then transfer printed to the hydraulic transfer printing, base film. As the printing ink used for the printing, a conventionally known one may be used.

The hydraulic transfer printing may be performed by floating the hydraulic transfer printing film on a surface of liquid, such as water, directing the printed surface upward, and pressing an article subjected to transfer printing, such as an arbitrary shaped object, from above there. Examples of a more detailed method of hydraulic transfer printing include a method comprising: a first step of floating a hydraulic transfer printing film on a liquid surface, directing the printed surface upward, and activating the print layer by spraying an ink activator or the like; a second step of pressing an, article subjected to transfer printing by lowering the article, directing a surface to be printed downward, against the hydraulic transfer printing film floated on the liquid surface from above; a third step of sufficiently fixing the print layer of the hydraulic transfer printing film to a surface of the article subjected to transfer printing, followed by removing a hydraulic transfer printing base film in the hydraulic transfer printing film; and a fourth step of sufficiently drying the article subjected to transfer printing having the surface on which the print layer is transfer printed.

The type of article subjected to transfer printing is not particularly limited, and examples of the article include: wooden substrates, such as wood, plywood, and particle board; various plastics; gypsum boards; fiber cement boards such as pulp cement board, slate board, and asbestos cement board; calcium silicate boards; magnesium silicate boards; glass fiber reinforced cement; concrete; boards made of metal, such as iron, stainless steel, copper, and aluminum; and composites thereof. The article subjected to transfer printing may have any surface shape of a smooth, rough, or bumpy surface. For more efficient use of the advantages of hydraulic transfer printing, the article subjected to transfer printing, preferably has a three dimensional bumpy surface or a curved surface.

EXAMPLES

The present invention is described below in further detail with reference to Examples while it should be noted that the present invention is not at all limited by them. The respective methods of measuring the arithmetic mean roughness (Ra) and the elongation at break of the hydraulic transfer printing base film are as follows.

Measurement of Arithmetic Mean Roughness (Ra) of Hydraulic Transfer Printing Base Film Measurement was made using a shape measurement laser microscope "VK-X200" manufactured by KEYENCE Corp. Specifically, arbitrary five areas on one surface of the hydraulic transfer printing base film were defined as measurement spots (the area of each measurement spot was 20 mm$^2$), and the individual arithmetic mean roughness (Ra) was measured at each measurement spot and a mean value of them was calculated to obtain the arithmetic mean roughness (Ra) of the hydraulic transfer printing base film. The arithmetic mean roughness (Ra) of 0.030 μm or more was determined as "A" (good) because the film surfaces do not easily adhere to each other, and the arithmetic mean roughness (Ra) of less than 0.030 μm, was determined as "B" (poor) because the film surfaces easily adhere to each other.

Measurement of Elongation at Break of Hydraulic Transfer Printing Base Film

The hydraulic transfer printing base film was cut in a width of 15 mm and humidity controlled in an atmosphere at 15° C., 40% RH for 1 week, followed by a tensile test using TENSILON UTM-4L manufactured by Oriented Corp. to obtain the elongation at break. The span between chucks was 150 mm and the tensile speed was 1,000 mm/min. The elongation at break of 10% or more was determined as "A" (good) and the elongation at break of less than 10% was determined as "B" (poor).

Measurement of Young's Modulus of Hydraulic Transfer Printing Base Film

By the same operation as the measurement of elongation at break, Young's modulus of 4400 MPa or more was determined as "A" (good) and Young's modulus of less than 4400 MPa was determined as "B" (poor).

Example 1

An aqueous solution was used as a liquid for film formation that contains 100 parts by mass of PVA (a saponified product of a homopolymer of vinyl acetate) with a degree of saponification of 88 mol % and a degree of polymerization of 1,700, 2 parts by mass of glycerin, and 2 parts by mass of talc with an average particle diameter of 5 μm and an aspect ratio of 17 as a plate filler and has a PVA concentration, of 18 mass %, and casted on a stainless steel belt at a temperature of 95° C. and dried for 2 minutes to obtain a hydraulic transfer printing base film with a thickness of 40 μm. The hydraulic transfer printing base film thus obtained was subjected to measurement of the arithmetic mean roughness (Ra), the elongation at break, and the Young's modulus in accordance with the above methods. The results are shown in Table 1.

Example 2

By the same operation as in Example 1 other than using talc with an average particle diameter of 8 μm and an aspect ratio of 27 as the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Example 3

By the same operation as in Example 1 other than using, talc with an average particle diameter of 12 μm and an aspect ratio of 40 as the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Example 4

By the same operation as in Example 1 other than, using, alumina fiber with an average particle diameter of 5 μm and an aspect ratio of 40 as a needle filler instead of the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 1

By the same operation as in Example 1 other than using talc with an average particle diameter of 1 μm and an aspect ratio of 3 as the plate filler and changing the amount to 5 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 2

By the same operation as in Example 1 other than using talc with an average particle diameter of 0.7 μm and an aspect ratio of 5 as the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 3

By the same operation as in Example 1 other than using talc with an average particle diameter of 2 μm and an aspect ratio of 3 as the plate filler and changing the amount to 10 parts by mass based on 100 parts by mass of the PVA a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 4

By the same operation as in Example 1 other than using talc with an average particle diameter of 5 μm and an aspect ratio of 17 as the plate filler and changing the amount to 1 part by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 5

By the same operation as in Example 1 other than, using talc with an average particle diameter of 8 μm and an aspect ratio of 27 as the plate filler and changing the amount to 20 parts by mass based on 100 parts by mass of the PVA, a hydraulic transfer printing base film with a thickness of 40 μm as obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 6

By the same operation as in Example 1 other than using talc with an average particle diameter of 15 μm and an, aspect ratio of 50 as the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 7

By the same operation as in Example 1 other than using talc with an average particle diameter of 7 μm and an aspect ratio of 70 as the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 8

By the same operation as in Example 1 other than using silica with an average particle diameter of 7 μm and an aspect ratio of 1 as a spherical filler instead of the plate filler and changing the amount to 10 parts by mass based on 100 parts by mass of the PVA, a hydraulic transfer printing base film with a thickness of 40 μm was obtained. The hydraulic transfer printing base film thus obtained was subjected to measurement of the arithmetic mean roughness (Ra), the elongation at break, and the Young's modulus in accordance with the above methods. The results are shown in Table 1.

Comparative Example 9

An aqueous solution was used as a liquid for film formation that contains 100 parts by mass of PVA (a saponified product of a homopolymer of vinyl acetate) with a degree of saponification of 88 mol % and a degree of polymerization of 1,700 and 2 parts by mass of glycerin and has a PVA concentration of 18 mass %, and casted on a stainless steel belt at a temperature of 95° C. and dried for 2 minutes to obtain a film with a thickness of 40 μm. Then, an aqueous solution was used as a coating liquid that contains 100 parts by mass of PVA with a degree of saponification of 94 mol % and a degree of polymerization of 2,000 and 2 parts by mass of talc with an average particle diameter of 5 μm and an aspect ratio of 17 as a plate filler and has a PVA concentration of 12 mass % to coat the above film at a speed, of 15 m/min. using a gravure roll with a gravure width of 54 cm and immediately dry the film for 30 seconds with a hot air at 100° C., and thus a multilayer hydraulic transfer printing base film having a coating layer with a thickness of 1.9 μm was obtained. The hydraulic transfer printing base film thus obtained was subjected to measurement of the arithmetic mean roughness (Ra), the elongation at break, and the Young's modulus in accordance with the above methods. The results are shown in Table 1.

TABLE 1

| | Film | | Filter | | | Adhesion | | Mechanical Strength | | | |
| | | | Average Particle Diameter | Aspect | Amount*¹⁾ parts by | Arithmetic Mean Roughness (Ra) | | Elongation at Break | | Young's Modulus | |
| | Form | Shape | μm | Ratio | mass | μm | Determination | % | Determination | MPa | Determination |
|---|---|---|---|---|---|---|---|---|---|---|---|
| Example 1 | Single Layer | Plate | 5 | 17 | 2 | 0.032 | A | 75 | A | 4460 | A |
| Example 2 | Single Layer | Plate | 8 | 27 | 10 | 0.138 | A | 41 | A | 5100 | A |
| Example 3 | Single Layer | Plate | 12 | 40 | 10 | 0.128 | A | 13 | A | 4590 | A |
| Example 4 | Single Layer | Needle | 5 | 40 | 10 | 0.088 | A | 20 | A | 5250 | A |
| Comparative Example 1 | Single Layer | Plate | 1 | 3 | 5 | 0.009 | B | 68 | A | 4670 | A |
| Comparative Example 2 | Single Layer | Plate | 0.7 | 5 | 10 | 0.013 | B | 38 | A | 4930 | A |
| Comparative Example 3 | Single Layer | Plate | 2 | 3 | 10 | 0.022 | B | 41 | A | 4850 | A |
| Comparative Example 4 | Single Layer | Plate | 5 | 17 | 1 | 0.025 | B | 87 | A | 4400 | A |
| Comparative Example 5 | Single Layer | Plate | 8 | 27 | 20 | 0.242 | A | 3 | B | 5220 | A |
| Comparative Example 6 | Single Layer | Plate | 15 | 50 | 10 | 0.097 | A | 6 | B | 4570 | A |
| Comparative Example 7 | Single Layer | Plate | 7 | 70 | 10 | 0.039 | A | 3 | B | 5560 | A |
| Comparative Example 8 | Single Layer | Spherical | 7 | 1 | 10 | 0.028 | B | 20 | A | 4630 | A |
| Comparative Example 9 | Multi-layer | Plate | 5 | 17 | 2*²⁾ | 0.035 | A | 102 | A | 4200 | B |

*¹⁾Amount based on 100 parts by mass of PVA
*²⁾Amount in Coating Layer based on 100 parts by mass of PVA The hydraulic transfer printing base films produced in Examples 1 to 4 had the arithmetic mean roughness (Ra) of 0.030 μm or more, the film surfaces did not easily adhere to each other, the mechanical strength of the films themselves was high and the films were not easily broken when fed from a roll.

The invention claimed is:

1. A single-layered hydraulic transfer printing base film, comprising:
   a polyvinyl alcohol; and
   from 1.5 to 15 parts by mass of a plate or needle filler with an average particle diameter of from 2 to 14 μm and an aspect ratio of from 4 to 60 based on 100 parts by mass of the polyvinyl alcohol.

2. The single-layered hydraulic transfer printing base film of claim 1, wherein the polyvinyl alcohol has a degree of saponification of from 80 to 99 mol %.

3. The single-layered hydraulic transfer printing base film of claim 1, wherein the polyvinyl alcohol has an average degree of polymerization of from 500 to 3,000.

4. A method of producing a hydraulic transfer printing base film, the method comprising:
   forming a film with a liquid comprising from 1.5 to 15 parts by mass of a plate or needle filler with an average particle diameter of from 2 to 14 μm and an aspect ratio of from 4 to 60 based on 100 parts by mass of a polyvinyl alcohol,
   wherein the liquid comprises the polyvinyl alcohol.

5. A roll formed by a method comprising rolling up the single-layered hydraulic transfer printing base film of claim 1.

6. A hydraulic transfer printing film produced by a method comprising:
   printing on a surface of the single-layered hydraulic transfer printing base film of claim 1.

7. A method of producing a hydraulic transfer printing film, the method comprising:
   feeding a hydraulic transfer printing base film from the roll of claim 5, thereby producing a fed base film; and
   printing on a surface of the fed base film.

8. A method of hydraulic transfer printing, the method comprising:
   floating the hydraulic transfer printing film of claim 6 on a liquid surface, directing a printed surface of the single-layered hydraulic transfer printing base film upward, thereby forming a floated hydraulic transfer printing film; and
   pressing an article on the floated hydraulic transfer printing film from above.

* * * * *